Patented Oct. 16, 1923.

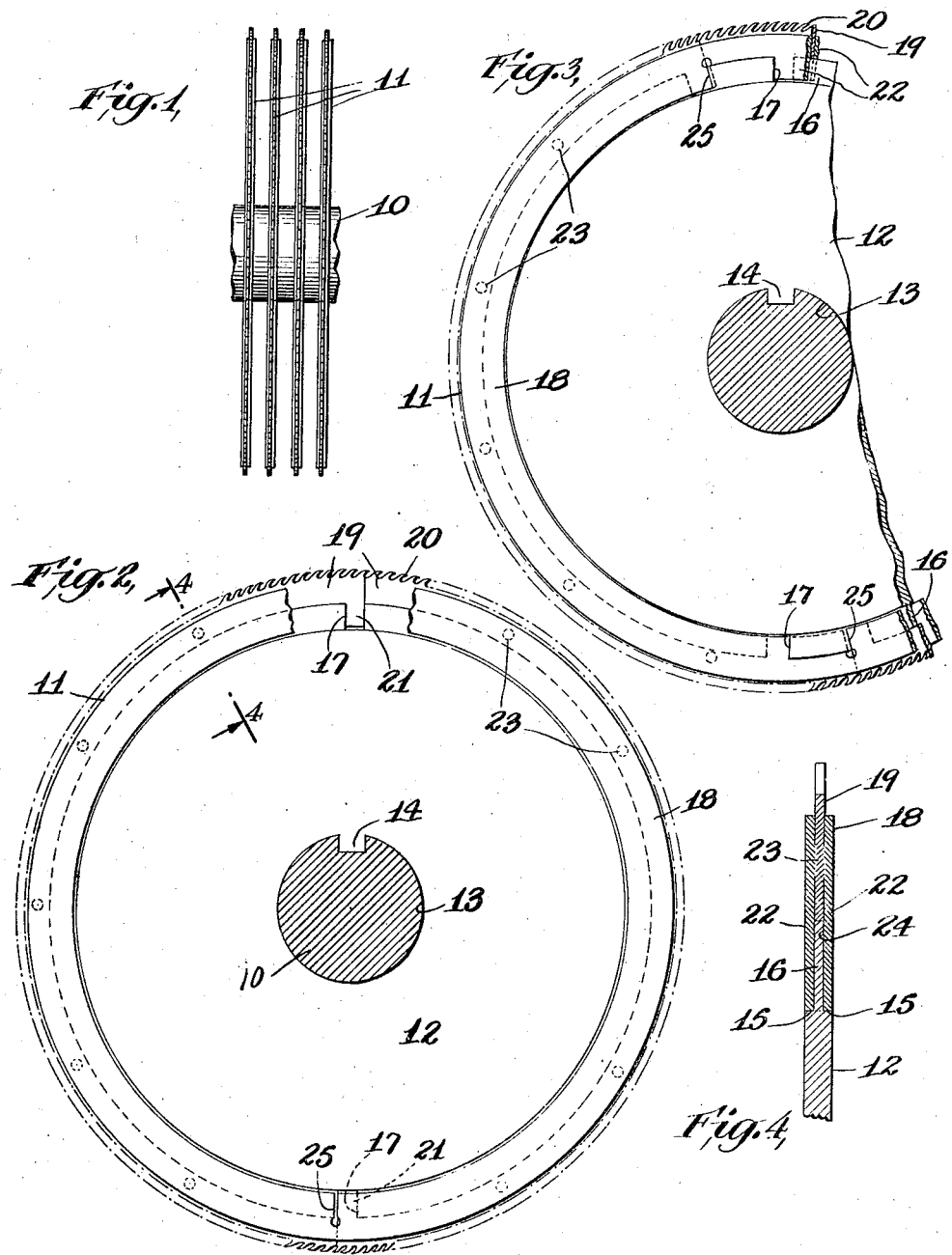

1,470,779

UNITED STATES PATENT OFFICE.

HERMAN TATJE, OF BROOKLYN, NEW YORK.

SAW FOR LINTER MACHINES.

Application filed October 18, 1922. Serial No. 595,263.

*To all whom it may concern:*

Be it known that I, HERMAN TATJE, a citizen of the United States, and residing at Brooklyn, in the county of Kings and State of New York, have invented certain new and useful Improvements in Saws for Linter Machines, of which the following is a specification, such as will enable those skilled in the art to which it appertains to make and use the same.

This invention relates to linter machines and particularly to what are known as the saws for such machines; and the object of the invention is to provide an improved saw blade of disk construction, which is designed to eliminate the wastes in material and to effect a saving in the cost of originally manufacturing saws of the class specified, and for replacing worn out or broken saws; a further object being to provide a saw of the class specified composed of a disk or body portion, the periphery of which is fashioned to receive and support a detachable ring-shaped cutter composed of a plurality of assembled sheet metal parts; and with these and other objects in view, the invention consists in a device of the class and for the purpose specified, which is simple in construction, efficient in use, and which is constructed as hereinafter described and claimed.

This invention is fully disclosed in the following specification, of which the accompanying drawing forms a part, in which the separate parts of my improvement are designated by suitable reference characters in each of the views, and in which:—

Fig. 1 is a side view of a part of the saw shaft of a linter machine, showing a number of my improved saws mounted thereon.

Fig. 2 is a side view of one of the saws shown in Fig. 1 on an enlarged scale, and with part of the construction broken away.

Fig. 3 is a view similar to Fig. 2 showing only a part of the construction, and with parts in a different position; and, Fig. 4 is a sectional detail view on the line 4—4 of Fig. 2 on an enlarged scale.

In the treatment of cotton, what are known as linter machines are employed for severing or parting the cotton from the seed in the different stages of handling the same, and the present practise is to provide a number of disk-shaped saw blades mounted on a shaft equally spaced apart thereon, the periphery of said blades being provided with teeth, and these blades are at present stamped from a single piece of sheet metal, and when the teeth become worn and rendered useless, the entire blade or disk must be thrown away or discarded, and it is the object of my invention to eliminate this waste of material, as well as to provide a simple and effective as well as strong and durable saw blade of the class and for the purpose specified.

In Fig. 1 of the drawing, I have shown at 10 the saw shaft of a linter machine with a number of my improved saws 11 mounted and spaced thereon, and in Figs. 2 to 4 inclusive, I have shown one of the saws in detail.

In carrying my invention into effect, I provide a disk or body portion 12 provided with a central aperture 13 through which the shaft 10 passes, and said disk being keyed to the shaft as shown at 14, and the opposite sides of the periphery portion of the disk 12 is recessed as shown at 15 in Fig. 4 of the drawing to form a central projecting and annular fin 16, which is provided at opposite radial points with recesses 17 clearly shown in Fig. 2 of the drawing.

I also employ an annular blade member 18, which is adapted to be detachably mounted in connection with the periphery portion of the disk 12, said member comprising in the construction shown, two semi-circular blades 19, substantially of the same form and construction and provided in the outer face thereof with teeth or projections 20 and at one end of each of said semi-circular blades is an inwardly projecting key member 21 adapted to cooperate with the recesses or aperatures 17 as hereinafter set out. I also employ two annular rings 22, and in forming the blade member 18, one of said rings is placed at each side of the blades 19, with the blades in the position shown in Fig. 2 of the drawing, and the rings are spot welded to the blades 19 at predetermined points as shown at 23 preferably adjacent to the periphery portion of the rings 22 to form a unitary construction of the separate parts of the blade member 18.

When the blade member 18 has been formed in the manner above set out, a channel 24 is formed between the inner faces of the blades 19 and the side rings 22 and this channel is adapted to receive the projecting fin 16 of the disk 12. The rings 22 are also provided at opposite points preferably in juxtaposition to the key member 21 of the blades 19 with slots 25 to permit of the threading and placement of the blade member upon the periphery of the disk 12, which result is accomplished as follows.

It will be understood that the disks 12 may be used over and over again and new blade members employed whenever desired, and in mounting a blade member in connection with one of the disks 12, one of the rings 22 where the slots 25 are located therein, is passed at one side of the projecting fin 16 on the disk 12, where the apertures 17 are located, and the blade member 18 is then rotated about the periphery of the disk 12 one half a revolution, at the end of which operation, the key members 21, which have traveled around the disk at one side of the fin 16, will spring into the apertures or recesses 17, and operate to key and retain the blade member 18 in position on the disk 12 and it will be apparent that the rings 22 will be located at the opposite sides of the fin 16, as illustrated in Fig. 4 of the drawing.

In removing the blade member 18, the above operation is reversed by first springing or forcing the key members 21 out of the recesses or apertures 17.

By making up the blades 19 in the form shown in the drawing, a material saving in the cost of manufacturing the blades is effected, and by making the blade members up in ring formation and mounting them on a disk-shaped holder, the expense of the disk-shaped holder is saved by its indefinite use, and it will be understood that while I have employed rings 22 for joining and reinforcing the separate blades 19, that I am not necessarily limited to this specific construction and various changes in and modifications of the construction herein shown and described, may be made within the scope of the appended claims without departing from the spirit of my invention or sacrificing its advantages.

In practise, the disk 12 as well as the blade member 18 mounted thereon is comparatively thin and in the accompanying drawing, the thickness of the several parts of the device is exaggerated to clearly illustrate the invention, and it will be understood that the teeth 20 of the blades 19 may be sharpened in the usual manner, and when the blade member is worn out, the same is discarded and a new blade member or a similar construction substituted.

Having fully described my invention, what I claim as new and desire to secure by Letters Patent, is:—

1. A device of the class described, comprising a mounting disk, a blade member adapted to be detachably mounted on the periphery of said disk, and means on said disk and said blade member for retaining said blade member against movement thereon, when in predetermined position, said blade member comprising a plurality of blades mounted between and secured to annular side members.

2. A device of the class described, comprising a mounting disk, a blade member adapted to be detachably mounted on the periphery of said disk, and means on said disk and said blade member for retaining said blade member against movement thereon, when in predetermined position, said blade member comprising a plurality of blades mounted between and secured to annular side members, with the teeth of said blades projecting beyond the periphery of said side members.

3. A linter saw of the class described, comprising a disk-shaped support, a blade member adapted to be detachably mounted in connection with said support, said support being provided at the periphery thereof with a reduced projecting fin, and said blade member being provided with an annular recess adapted to receive the fin of said support.

4. A linter saw of the class described, comprising a disk-shaped support, a blade member adapted to be detachably mounted in connection with said support, said support being provided at the periphery thereof with a reduced projecting fin, and said blade member being provided with an annular recess adapted to receive the fin of said support, said fin being provided at predetermined points with apertures, and said blade member with slots to permit of the mounting of the blade member on the periphery of said support.

5. A linter saw of the class described, comprising a disk-shaped support, a blade member adapted to be detachably mounted in connection with said support, said support being provided at the periphery thereof with a reduced projecting fin, said blade member being provided with an annular recess adapted to receive the fin of said support, said fin being provided at predetermined points with apertures and said blade member with slots to permit of the mounting of the blade member on the periphery of said support, and said blade member being provided with key members adapted to cooperate with the apertures in said fin to lock the blade member in predetermined position on said support.

6. A linter saw of the class described, comprising a disk-shaped support, a blade member adapted to be detachably mounted in connection with said support, said support being provided at the periphery thereof with a reduced projecting fin, said blade member being provided with an annular recess adapted to receive the fin of said support, said fin being provided at predetermined points with apertures and said blade member with slots to permit of the mounting of the blade member on the periphery of said support, and said blade member being provided with key members adapted to cooperate with the apertures in said fin to lock the blade member in predetermined position on said support, said blade member being composed of independently formed blades.

7. A linter saw of the class described, comprising a disk-shaped support, a blade member adapted to be detachably mounted in connection with said support, said support being provided at the periphery thereof with a reduced projecting fin, said blade member being provided with an annular recess adapted to receive the fin of said support, said fin being provided at predetermined points with apertures and said blade member with slots to permit of the mounting of the blade member on the periphery of said support, said blade member being provided with key members adapted to cooperate with the apertures in said fin to lock the blade member in predetermined position on said support, said blade member comprising independently formed blades, and annular members at the opposite sides of said blades and secured thereto.

8. An annular blade member of the class described, said blade member being provided on the periphery thereof with teeth or projections, the inner face of said blade member being provided with an annular groove, whereby said blade member may be detachably mounted on a suitable support.

9. An annular blade member of the class described, said blade member being provided on the periphery thereof with teeth or projections, the inner face of said blade member being provided with an annular groove, whereby said blade member may be detachably mounted on a suitable support, and means for keying said blade member to said support.

10. An annular blade member of the class described, said blade member being provided on the periphery thereof with teeth or projections, the inner face of said blade member being provided with an annular groove, whereby said blade member may be mounted on a suitable support, means for keying said blade member to said support, and the teeth or projections of said blade member being formed on independent blades.

11. A blade member of the class described, comprising a plurality of arc-shaped blades, rings mounted at the opposite sides of said blades and secured thereto to form an annular blade member.

12. A blade member of the class described, comprising a plurality of arc-shaped blades, rings mounted at the opposite sides of said blades and secured thereto to form an annular blade member, the inner face of which is provided with a groove.

13. A blade member of the class described, comprising a plurality of arc-shaped blades, rings mounted at the opposite sides of said blades and secured thereto to form an annular blade member, the inner face of which is provided with a groove, and said blades being provided with key members projecting into said groove.

In testimony that I claim the foregoing as my invention I have signed my name this 17th day of Oct., 1922.

HERMAN TATJE.